Dec. 20, 1949     J. P. LONGWELL     2,491,500
CONTROLLED CATALYTIC VAPOR PHASE PROCESS
Filed May 7, 1946
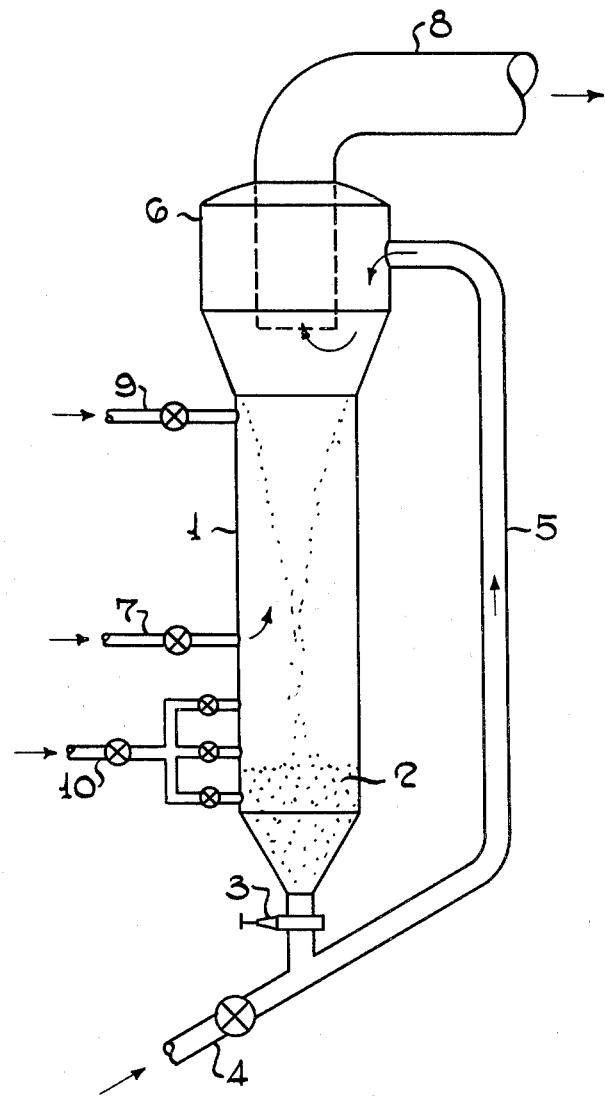
John P. Longwell Inventor
By J. L. Small Attorney

UNITED STATES PATENT OFFICE 2,491,500

CONTROLLED CATALYTIC VAPOR PHASE PROCESS

John P. Longwell, Roselle Park, N. J., assignor to Standard Oil Development Company, a corporation of Delaware Application May 7, 1946, Serial No. 667,788

1 Claim. (Cl. 260—342)

This invention relates to a catalytic vapor phase procedure involving a controlled short period of contact between a free falling catalyst and a stream of reactant vapors. Particularly, it relates to the production of phthalic anhydride by partial oxidation of an aromatic hydrocarbon, wherein the reactant hydrocarbon vapor is passed countercurrently to a free falling oxidation catalyst.

Data obtained in the production of phthalic anhydride show that the process is best accomplished when the reactant is in contact with the catalyst for less than one second, and preferably only a few tenths of a second. This requirement imposes a severe limitation on conventional fluid catalyst systems, wherein uniform contact of reactant vapor with catalyst is not obtained due to entrapment and recirculation of vapor with the catalyst in the reaction zone. Also, it is inherently difficult to achieve uniform distribution of vapors across shallow dense beds of fluidized catalyst or fixed catalyst in obtaining short contact times, and a correspondingly high concentration of heat exchange surface is required in the catalyst bed to remove the heat of reaction. In other words, optimum conditions for reactions requiring strictly controlled short contact periods, as in partial oxidation of aromatic hydrocarbons to produce phthalic anhydride, are not obtainable in conventional fluidized catalyst or fixed catalyst equipment.

An object of this invention is to provide a method and means for obtaining uniform contact of a reactant vapor with a solid catalyst for a limited duration in a highly selective reaction, more particularly in a partial oxidation of an aromatic hydrocarbon, to obtain optimum yields of phthalic anhydride.

Optimum conditions of operation are obtained in a practical type of reactor, in accordance with the present invention, by pouring free falling solid catalyst particles down through a rising stream of gaseous reactants in a reaction zone wherein turbulence is avoided, and appropriately disengaging vapors from the catalyst. Contact of the reactant vapors with the free falling catalyst is quite uniform in the reaction zone and a quick disengagement of vapors from the catalyst is obtained at the ends of the reaction zone. In this operation heat control is achieved in recirculation of the catalyst outside the reaction zone.

In the accompanying drawing is shown schematically an elevational view of a reactor suitable for the operation.

Referring to the drawing, the reactor 1 is a vertically elongated cylindrical vessel with catalyst particles in a sufficient dense phase 2 at its lower end to supply the necessary pressure head for moving the catalyst through a slide valve 3 at the bottom. In passing the slide valve 3 the catalyst falls into a stream of pick-up gas, such as steam injected from line 4 to move the catalyst through a transfer line 5 to a separator 6 connected to the upper part of the reactor 1. In the separator 6, the catalyst particles become separated from the pick-up gas and gravitate thence into the reaction zone to fall freely through the reaction zone of limited distance within reactor 1 back down to the dense phase or mass of catalyst collected below the reaction zone.

If desired, the catalyst may be collected in a dense phase at the bottom of a separator corresponding to separator 6 before gravitating into the reaction zone. The pick-up gas from transfer line 5 may then be withdrawn from the separator unmixed with reaction vapor products but may be combined thereafter with vapor products from the reaction zone.

Heat exchange surface is included in the transfer line 5 and may be included in the reactor. The pick-up gas itself may be controlled in temperature to absorb heat from the recirculated catalyst as sensible heat.

Gaseous reactant feed, such as 1 to 2 mole per cent of naphthalene vapor in air, is introduced into the reactor 1 at a point 7 somewhat above the top of the dense phase 2. This point of reactant feed introduction marks the lower end of the reaction zone. The reactant vapor streams continuously up through the reaction zone and finally out the product line 8 at the top. Uniform contact is obtained between the reactant vapor in the continuously upwardly flowing stream with the free-falling catalyst descending into the reaction zone from the separator 6, and, consequently, the desired reaction occurs in the dilute phase. Since the incoming catalyst gravitates countercurrently to the rising gaseous reactant stream, no disengagement problem is involved at the top of the reactor. Some extremely fine catalyst particles may be carried over past separator 6 into the product line 8 without interference in the operation. The extremely fine catalyst particles or dust may be recovered in the conventional recovery system. The incoming catalyst from the separator 6 enters the reaction zone where the concentration of reactants is low and at a point which marks the upper end of the reaction zone. Steam or inert gas may be introduced at the upper end of the reaction zone through line 9 to minimize absorption of reactant vapors by the incoming catalyst and scatter the falling catalyst.

Steam is also introduced through line 19 into the lower portion of the reactor 1, chiefly to insure adequate and prompt stripping of vapors from the catalyst falling from the reaction zone into the dense phase; and depending on the nature of the catalyst, the steam may function to a certain extent for aerating the catalyst in the dense phase.

The catalyst employed may be of any suitable type with sufficient size and density for obtaining free falling movement countercurrent to the flow of the reactant vapor in the reaction zone. For the production of phthalic anhydride, the catalyst is preferably 20–60 mesh microspheres of fused vanadium oxide. Data obtained on operations using fused vanadium oxide microspheres indicate that about 20–40 mesh coarse microspheres are optimum for the operation of the type described. The following example demonstrates the high efficiency of a process representative of the technique in which a rising stream of reactant vapor is contacted for a precisely controlled reaction period with a free-falling catalyst.

| | |
|---|---|
| Catalyst | 100% fused vanadium oxide |
| Catalyst size mesh | 20–40 |
| Average Vapor Temp., °F. | 1050 |
| Feed concentration, mole per cent naphthalene vapor in air | 0.8 |
| Contact time, seconds | 0.5 |
| Product distribution: | |
| Phthalic anhydride, mole per cent | 87 |
| Maleic anhydride, mole per cent | 10 |
| Net $CO+CO_2$, mole per cent | 2 |
| Conversion, per cent | 100 |
| Selectivity to phthalic anhydride, per cent | 87 |

While the procedure of this invention is directed primarily to vapor phase oxidation, such as the production of phthalic anhydride, it may be advantageously employed in other operations where short contact periods are required and especially where undesired side reactions occur when the reactants and products are subjected to excessive contact with the catalyst. The extreme simplicity of this type of operation and the uniformity of contact of vapors with catalyst make the process an attractive one for such operations as the partial oxidation of naphthalene or orthoxylene to phthalic anhydride.

In addition to the uniform contact time of vapors with catalyst, an important advantage in the type of process described is the comparative uniformity of temperature. Since the sensible heat of the catalyst is large compared to the sensible heat of the vapors or the heat of reaction, the vapors are very quickly brought to reaction temperature and the reaction proceeds on the surface of the catalyst without any further significant change in temperature level. Heat of reaction is removed from the catalyst by heat exchange surface within the "dense phase" in the lower portion of the reactor, and the cooled catalyst is returned as indicated to the top of the vessel for recycling. This technique is advantageous because the coolest catalyst is thus in contact with the hottest vapors, which further tends to level the reaction zone temperature and is in the direction at least of quenching of the reactant vapors at the end of the reaction zone. Thus, with the rising vapor products in the reaction zone having an optimum reaction temperature in the range of 950° to 1100° F., the cooled catalyst introduced at the upper part of the reaction zone to start its free-falling movement is able to abruptly chill the vapor product stream to a temperature of about 950° F. to 900° F. or less.

Another advantageous feature in the operation described is the promotion of rapid stripping of reactant vapor from the catalyst as it leaves the lower part of the reaction zone. Here the steam or stripping gas can be injected into the vessel as a cross current with respect to the stream of falling catalyst to more effectively and quickly strip reactant vapor from the catalyst particles. The entrainment of reactant vapor with the falling catalyst particles may be visualized as a carrying along by each particle of a vapor film in the form of a comet's tail, which is difficult to remove while the catalyst moves concurrently with a vapor carrier. The entrained vapor film is readily removed by a stripping gas moving approximately normal to the plane of motion of solid particles. The stripped vapors mixed with the stripping gas flow upwardly into the reaction zone to join the gaseous reactant stream.

Various modifications may be introduced without departing from the principles of operation involved.

I claim:

The method of catalytically oxidizing an aromatic hydrocarbon to produce phthalic anhydride, which comprises flowing vapor of the aromatic hydrocarbon mixed with oxygen-containing gas in a continuous stream up through a reaction zone, contacting said stream of vapor and gas for a period of less than one second with free-falling fused vanadium oxide microspheres of about 20–60 mesh in the reaction zone at a temperature in the range of 950° to 1100° F., stripping vapor from the falling vanadium microspheres at a point below the reaction zone with a current of steam, collecting the microspheres stripped of reactant vapor, picking up the microspheres in a stream of steam, cooling the microspheres dispersed in the steam at a temperature below 900° F., transferring the cooled microspheres in the steam to a point above the reaction zone, separating the cooled microspheres from the steam, pouring the cooled microspheres into a stream of higher temperature vapor rising from the reaction zone.

JOHN P. LONGWELL.

REFERENCES CITED

The following references are of record in the file of this patent:

UNITED STATES PATENTS

| Number | Name | Date |
|---|---|---|
| 2,340,878 | Holt et al. | Feb. 8, 1944 |
| 2,373,008 | Becker | Apr. 3, 1945 |